United States Patent

[11] 3,591,255

[72] Inventor Richard S. Ploss
 Danvers, Mass.
[21] Appl. No. 784,322
[22] Filed Dec. 17, 1968
[45] Patented July 6, 1971
[73] Assignee Baird-Atomic, Inc.
 Cambridge, Mass.

[54] FIBER OPTIC BUNDLE ELECTRO-OPTICAL IMAGE CONVERTER
 4 Claims, 2 Drawing Figs.
[52] U.S. Cl. .................................................. 350/150, 350/96
[51] Int. Cl. .................................................. G02f 1/26
[50] Field of Search ......................................... 350/96, 150, 151, 96 B

[56] References Cited
UNITED STATES PATENTS
3,030,852 4/1962 Courtney-Pratt ............ 350/151 X

*Primary Examiner*—David Schonberg
*Assistant Examiner*—Paul R. Miller
*Attorney*—Morse, Altman & Oates ABSTRACT: An optical image is presented in terms of visible light directed through contiguous light pipes to a Pockels effect plate disposed between a polarizer and an analyzer. Each of the light pipes is coated with a conducting metal so that each point on the Pockels effect plate can be controlled by a potential that is locally applied in such a way as to control transmissivity. In consequence, image information is applied to the assemblage by controlling the transmissivities of the various points independently.

PATENTED JUL 6 1971 3,591,255

INVENTOR
Richard S. Ploss
BY
Morse, Altman & Oates
ATTORNEYS

FIBER OPTIC BUNDLE ELECTRO-OPTICAL IMAGE CONVERTER

BACKGROUND AND SUMMARY OF THE INVENTION

The present invention relates to electro-optics and, more particularly, to electro-optic techniques for transducing one form of image information, e.g. corresponding electronic signals, into a visual presentation. One form of electro-optic valve is characterized by a Pockels effect plate, which exhibits a particular degree of retardation of polarized light when subjected to an applied potential. Thus polarized light transmitted therethrough is rotated between an orientation by which it is transmitted through an analyzer and an orientation by which it is blocked by the analyzer.

The primary object of the present invention is to associate, with such a Pockels effect plate, an array of conducting light pipes, which are capable both of transmitting increments of electrical potential to associated increments of the Pockels effect plate. Thus an increment of light supplied by a light pipe can be retarded on signal. In consequence, an image is generated by a beam of light transmitted through the light pipe array, the polarizer, the Pockels effect plate and the analyzer.

Other objects of the present invention will in part be obvious and will in part appear hereinafter.

BRIEF DESCRIPTION OF THE DRAWINGS

For a fuller understanding of the nature and objects of the present invention, reference is made to the following detailed description, taken together with the accompanying drawing wherein.

DETAILED DESCRIPTION

Figure 1:
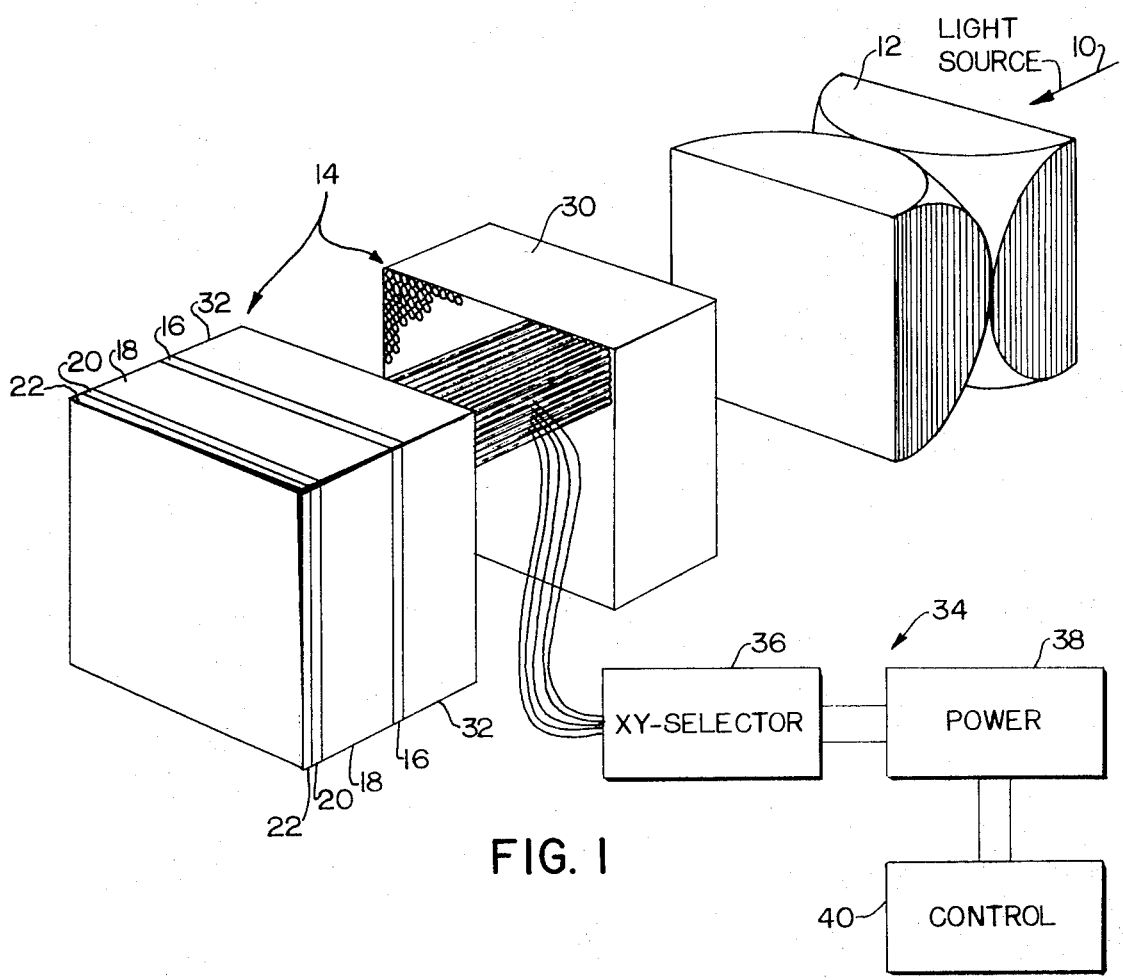
FIG. 1 illustrates a system, having a conducting light pipe structure in accordance with the present invention.

Generally, the illustrated embodiment of the present invention comprises a source of illumination 10, a collimating lens 12, a polarizer 16, an array 14 of light pipes, a Pockels effect plate 18 through which polarized light from the polarizer is directed, a transparent electrode stratum 20 for cooperation with any incremental potential applied by any of the light pipes and an analyzer 22 having a polarization axis that is crossed with respect to the polarization axis of the polarizer.

As shown, the polarizer and the analyzer are composed of any of a variety of materials, for example, dichroic polarizers characterized by two polarized beams one of which is isolated from the other by absorption, birefringent polarizers characterized by two polarized beams one of which is isolated from the other by refraction, and crystal polarizers characterized by two polarized beams one of which is isolated from the other by a "pile of plates." Generally, the Pockels effect plate is an electro-optic medium in the form of a tetragonal crystal such as potassium dihydrogen phosphate and isomorphic deuterated potassium dihydrogen phosphate, trigonal crystals such as lithium niobate and cubic crystals such as cuprous chloride. Preferably the electro-optic plate ranges in thickness between 0.002 and 1.0 inch. Certain of these materials, all of which exhibit Pockels effect, are described in U.S. Pat. No. 2,463,109, issued March 1, 1949, and U.S. Pat. No. 2,616,962, issued Nov. 4, 1962, both in the name of Hans Jaffe. In the form shown, source of illumination 10 includes a suitable incandescent lamp having an incandescent filament and a curved reflector. Transparent conductor 20, for example, is composed of Nesa glass.

Figure 2:
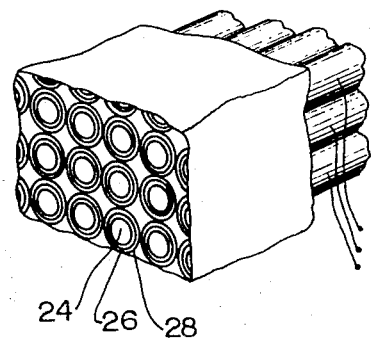
FIG. 2 is an exaggerated perspective view of the conducting light pipe structure of the system of FIG. 1.

As it is best shown in FIG. 2, light pipe array 14 includes a multiplicity of light pipes, each of which has a cylindrical core 24, composed of a first optically clear material having a first index of refraction, an inner annular sheath 26 composed of a second optically clear material having a second index of refraction, an annular outer sheath 28 composed of an electrically conducting metal, and an outer sheath of insulating dielectric. Core 24, for example, is composed of a first optically clear glass an sheath 26, for example, is composed of a second optically clear glass, the index of refraction of sheath 26 being less than the index of refraction of core 24 in order to ensure total internal reflection with the light pipe.

Array 14 is shown in FIG. 1 as having a rearward section 30 and a forward section 32, which are coherent with each other and which are separated from each other. The light pipes extend from the front face through the body and through the rear face of section 30, between sections 30, 32 and from the front face, through the body and to the rear face of section 32. The rearward extremities of the light pipes are in contact with Pockels effect plate 18.

As shown, each of the metallic coats of the light pipes of array 14 is connected by a suitable lead to an electronic system shown generally at 34. System 34 includes an XY selector circuit 36, a driver circuit 38 and an interface control 40. System 34 thus, by controlling the potential on the electrodes, determine the incremental intensity in a manner now to be described.

In operation, light from illumination source 10, after being directed by collimator 12 thence through the forward and rearward sections of array 14, is directed through polarizing Pockels plate 18 and analyzing plate 22. Ordinarily, because of the crossed relation between polarizer 16 and analyzer 20, no light actually emanates from analyzer 22. However, when an appropriate potential is placed upon a selected light pipe, the potential applied between this electrode and transmitting conductor 20 causes retardation to occur incrementally and light to be emitted in the selected area.

The foregoing disclosure thus provides an electro-optic system involving a Pockels effect system by which visible images are produced in response to signals from an electronic circuit. Since certain changes may be made in the foregoing disclosure without departing from the scope of the invention herein, it is intended that all matter contained in the above description or shown in the accompanying drawing be interpreted in an illustrative and not in a limiting sense.

What I claim Is:

1. An electro-optic device comprising a Pockels effect assemblage for converting applied electrical signals to a retardation pattern, said Pockels effect assemblage comprising a Pockels effect plate capable of retarding polarized light at various locations thereon to a degree that is functionally related to an applied potential thereacross, a multiplicity of electrically conducting light pipes terminating at said Pockels effect plate, each such light pipe including an inner optically clear core having a relatively high index of refraction, a medial optically clear sheath having a relatively low index of refraction, an outer electrically conducting sheath and an insulating dielectric sheath, a polarizer and an analyzer on opposite sides of said Pockels effect plate, a source of illumination for illuminating the entrance aperture of said light pipes, and a transparent conductor for cooperating with the rearward extremities of said conducting light pipes in order to establish incremental potentials across said Pockels effect plate, said light pipes being coherent, portions of said light pipes being encapsulated in a plastic matrix.

2. The electro-optic device of claim 1 wherein opposite extremities of said light pipes are encapsulated in plastic matrices and medial portions of said light pipes are free.

3. An electro-optic device comprising a Pockels effect assemblage for converting applied electrical signals to a retardation pattern, said Pockels effect assemblage comprising a Pockels effect plate capable of retarding polarized light at various locations thereon to a degree that is functionally related to an applied potential thereacross, a multiplicity of electrically conducting light pipes terminating at said Pockels effect plate, each such light pipe including an inner optically clear core having a relatively high index of refraction, an optically clear sheath having a relatively low index of refraction, an electrically conducting sheath and an outer insulating dielectric sheath, a polarizer and an analyzer on opposite sides of said Pockels effect plate, a source of illumination for illuminating the entrance aperture of said light pipes, a transparent conductor for cooperating with the rearward extremities of said conducting light pipes in order to establish incremental potentials across said Pockels effect plate, and a control for selectively energizing different ones of the electrically conducting metallic sheaths, said light pipes being coherent, said control including an XY logic circuit and electrical leads therefrom to said electrically conducting metallic sheaths.

4. The electro-optic device of claim 3 wherein opposite extremities of said light pipes are encapsulated in plastic matrices and medial portions of said light pipes are free.